United States Patent
Nagai et al.

(10) Patent No.: US 6,490,227 B2
(45) Date of Patent: Dec. 3, 2002

(54) DEVICE AND METHOD FOR DETECTING POSITION OF MOVABLE BODY BY USING ULTRASONIC WAVES

(75) Inventors: Katsumi Nagai, Kariya (JP); Yasunobu Yagita, Toyohashi (JP)

(73) Assignees: Kabushiki Kaisha Toyoda Jidoshokki Seisakusho, Kariya (JP); Honda Electronics Co., Ltd., Toyohashi (JP)

( * ) Notice: Subject to any disclaimer, the term of this patent is extended or adjusted under 35 U.S.C. 154(b) by 0 days.

(21) Appl. No.: 09/803,536

(22) Filed: Mar. 9, 2001

(65) Prior Publication Data

US 2001/0022756 A1 Sep. 20, 2001

(30) Foreign Application Priority Data

Mar. 14, 2000 (JP) ........................................ 2000-070330

(51) Int. Cl.[7] ............................. G01S 15/88; F15B 15/28
(52) U.S. Cl. ........................................................ 367/99
(58) Field of Search .................................... 367/99, 908

(56) References Cited

U.S. PATENT DOCUMENTS 4,543,649 A    9/1985  Head et al. .................... 367/96
6,119,579 A  * 9/2000  Pawelski ....................... 92/5 R

FOREIGN PATENT DOCUMENTS

| EP | 0 949 193 A2 | 10/1999 | ............ B66F/9/20 |
| EP | 1 078 877 A1 | 2/2001 | ............ B66F/9/075 |
| GB | 2 043 250 A | 10/1980 | ............ G01B/17/00 |
| GB | 2 172 995 A | 10/1986 | ............ G01S/15/10 |
| JP | 401118790 A | * 5/1989 | ............ 367/99 |
| JP | 10-238513 | 9/1998 | ............ F15B/15/28 |
| JP | 10-282224 | 10/1998 | ............ G01S/7/526 |

* cited by examiner

*Primary Examiner*—Ian J. Lobo
(74) *Attorney, Agent, or Firm*—Morgan & Finnegan, LLP

(57) ABSTRACT

An ultrasonic sensor is located in the bottom of a lift cylinder of a forklift and emits ultrasonic waves toward a piston in the cylinder. A controller controls the ultrasonic sensor to consecutively emit ultrasonic waves that have different amplitudes at predetermined intervals. The ultrasonic waves are emitted in order of smallness of amplitude. The controller computes the distance between the ultrasonic sensor and the piston based on a period from when the ultrasonic sensor emits one of the ultrasonic waves to when the ultrasonic sensor receives the ultrasonic wave that is reflected by the piston. As a result, the range of the detectable distances is extended.

14 Claims, 6 Drawing Sheets

DEVICE AND METHOD FOR DETECTING POSITION OF MOVABLE BODY BY USING ULTRASONIC WAVES

BACKGROUND OF THE INVENTION

The present invention relates to a device and a method for detecting the position of a movable body by using ultrasonic waves. More particularly, the present invention pertains to a device and a method that use an ultrasonic sensor to detect the position of a piston in a hydraulic cylinder used in industrial vehicles.

A typical forklift has a fork for lifting and lowering a cargo. Some forklifts are equipped with an automatic controller for lowering or lifting the fork to a predetermined position. The automatic controller requires a fork height sensor to continuously detect the height of the fork.

Reel-type fork height sensors are known in the art. A reel type sensor includes a wire, a reel for winding the wire and a rotation sensor such as a potentiometer. One end of the wire is connected to an inner mast. As the inner mast is lifted or lowered, the rotation position of the reel changes. The rotation sensor detects rotation of the reel. The height of the fork is detected based on the rotational position of the reel.

However, since the reel, around which the wire is wound, is relatively large, the reel-type sensor occupies relatively large space. Also, the wire and the potentiometer, which are exposed, can be damaged by contact with foreign objects, which may make the sensor less reliable.

Japanese Unexamined Patent Publication No. 10-238513 discloses a fork height detector that uses an ultrasonic sensor. The ultrasonic sensor is located in a lift cylinder for lifting and lowering a fork and detects the location of a piston in the lift cylinder. The height of the fork is detected based on the detected position of the piston.

Specifically, the ultrasonic sensor is located at the bottom of the cylindrical housing. The ultrasonic sensor emits ultrasonic waves to the end surface of the piston and receives the reflected ultrasonic waves. The distance between the sensor and the piston, or the position of the piston, is calculated based on the traveling time of an ultrasonic wave, or the time from when an ultrasonic wave is emitted to when the reflected wave is received. The height of the fork is calculated based on the detected piston position. Unlike reel-type sensors, the ultrasonic sensor, which is located in the lift cylinder, is not exposed. Therefore, the height detector is less vulnerable to damage, which improves reliability.

When the distance between the ultrasonic sensor and an object is relatively short, reverberation due to the emission of an ultrasonic wave remains until the reflected wave is received by the sensor. Since the sensor induces voltage signals based on the reverberation and a voltage signal based on a reflected wave, whether the reflected wave is received cannot be accurately detected based on the voltage signal outputted by the ultrasonic sensor. Thus, normally, a distance range between the sensor and one tenth of the maximum distance that can be detected by an ultrasonic sensor is out of the detectable distance range of the sensor.

Figure 7:
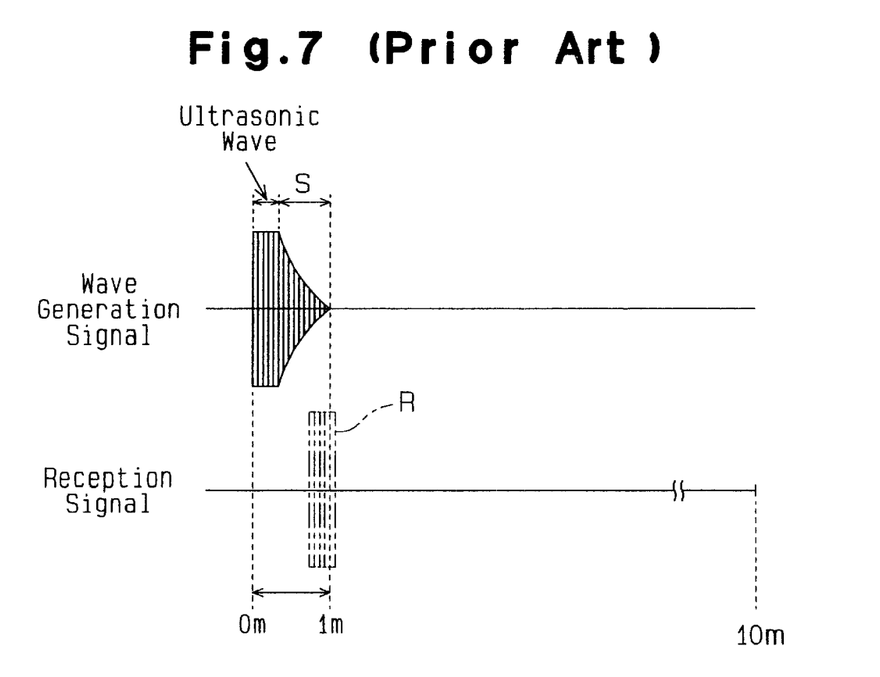
FIG. 7 is a graph showing the detection procedure of a prior art position detector.

If the maximum distance that can be detected by an ultrasonic sensor is, for example, ten meters as shown in FIG. 7, the detectable distance range is from a point that is one meter away from the sensor to the ten meter point. When a wave generation signal (voltage signal) is supplied to the ultrasonic sensor, the sensor generate an ultrasonic wave and induces a voltage signal S based on the reverberation of the ultrasonic wave. When the distance between the sensor and an object is shorter than one meter, the sensor induces a reception signal (voltage signal) R based on the received reflected wave while the voltage signal S is being generated. The time at which the reception signal R is generated cannot be detected based on the synthesized signal of the voltage signals S and R. Therefore, the detectable range of the ultrasonic sensor is limited.

SUMMARY OF THE INVENTION

Accordingly, it is an objective of the present invention to provide a device and a method for detecting the position of a movable body in a wide range of distance by using ultrasonic.

To achieve the foregoing and other objectives and in accordance with the purpose of the present invention, a device for detecting the position of a movable body that moves in a predetermined move range is provided. The device includes an ultrasonic sensor and a controller for controlling the ultrasonic sensor. The ultrasonic sensor emits ultrasonic waves toward the movable body and receives ultrasonic waves that are reflected by the movable body. The controller controls the ultrasonic sensor to consecutively emit a plurality of ultrasonic waves that have different amplitudes at predetermined intervals, thereby measuring the distance between the ultrasonic sensor and the movable body. The controller computes the distance between the ultrasonic sensor and the movable body based on a period from when the ultrasonic sensor emits one of the ultrasonic waves to when the ultrasonic sensor receives the one ultrasonic wave that is reflected by the movable body.

The present invention may also be applied to a method for detecting a position of a movable body that moves in a predetermined move range by using ultrasonic waves emitted form an ultrasonic sensor. The method includes consecutively emitting a plurality of ultrasonic waves that have different amplitudes at predetermined intervals from the ultrasonic sensor, thereby measuring the distance between the ultrasonic sensor and the movable body, and computing the distance between the ultrasonic sensor and the movable body based on a period from when the ultrasonic sensor emits one of the ultrasonic waves to when the ultrasonic sensor receives the one ultrasonic wave that is reflected by the movable body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A height detector according to a first embodiment of the present invention will now be described with reference to FIGS. 1 to 6. The height detector is used in a forklift.

Figure 6:
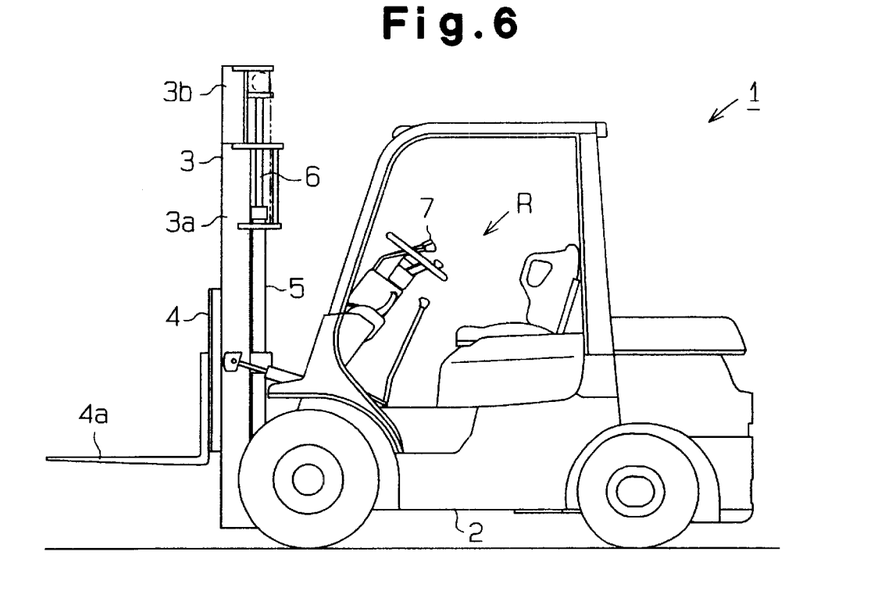
FIG. 6 is a side view illustrating a forklift that has the lift cylinder of FIG. 1.

As shown in FIG. 6, an industrial vehicle, which is a forklift 1 in this embodiment, includes a mast assembly 3, which is arranged on the front of a body frame 2. The mast assembly 3 includes an outer mast 3a and an inner mast 3b. The inner mast 3b is arranged inside of the outer mast 3a and is lifted and lowered relative to the outer mast 3a. A lift bracket 4 is arranged inside the inner mast 3b. A fork 4a is supported by the lift bracket 4. A hydraulic cylinder, which is a lift cylinder 5 in this embodiment, is located behind the mast assembly 3. Oil is used in the lift cylinder 5 for transmitting power. The lift cylinder 5 includes a piston rod 6, the distal end of which is coupled to the upper portion of the inner mast 3b. A chain wheel (not shown) is supported in the upper portion of the inner mast 3b. A chain is engaged with each chain wheel. A first end of each chain is fixed to the lift bracket 4, while a second end is fixed to the upper portion of the lift cylinder 5. A loading lever 7 is located in a cab R. The lift cylinder 5 extends and retracts the piston rod 6 in response to manipulation of the loading lever 7. Accordingly, the lift bracket 4 and the fork 4a are lifted and lowered along the mast assembly 3.

Figure 1:
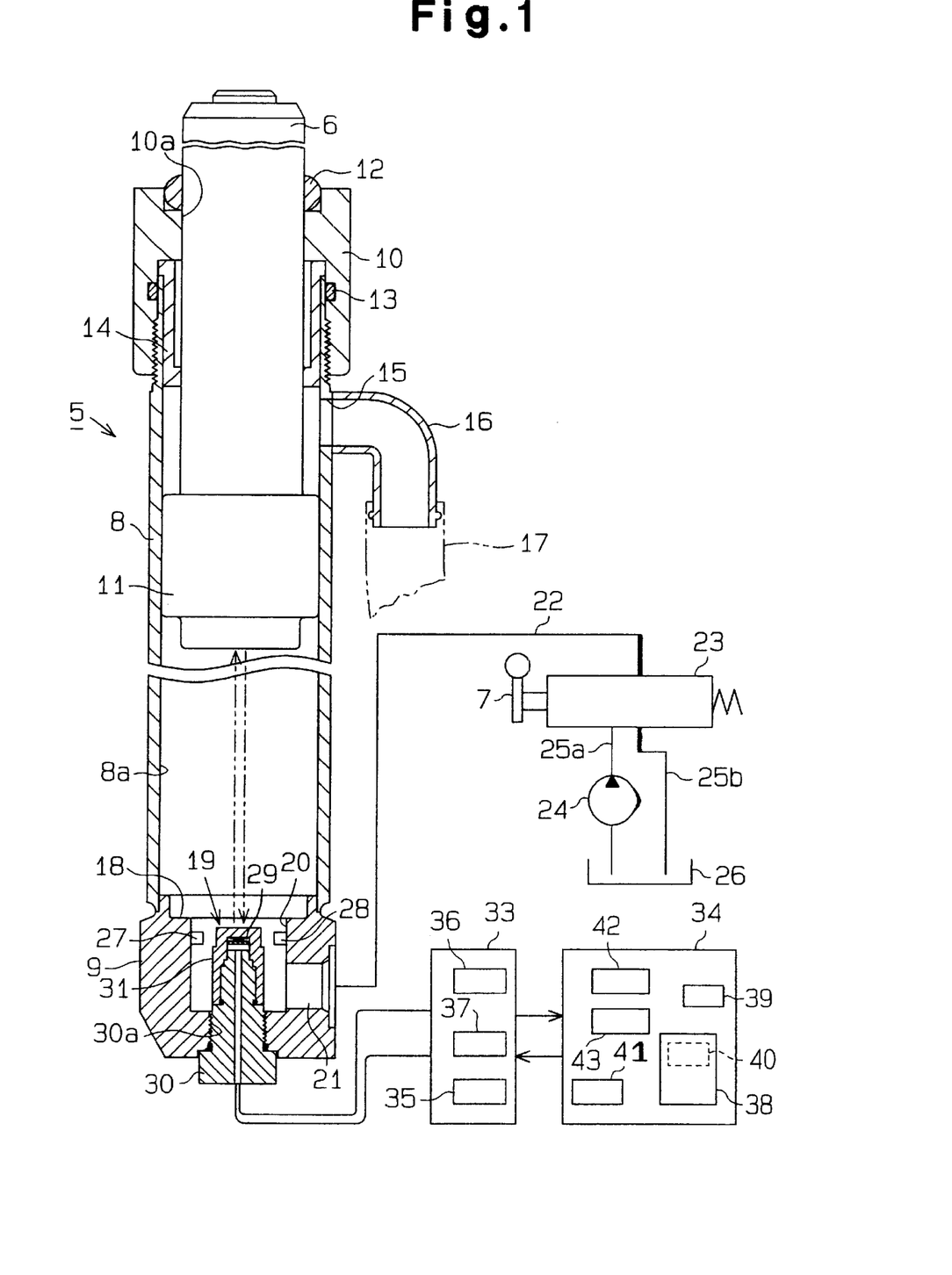
FIG. 1 is a cross-sectional view illustrating a position detector located in a lift cylinder according to a first embodiment of the present invention.

As shown in FIG. 1, the lift cylinder 5 is a single acting cylinder and includes a cylindrical housing 8, a bottom block 9, a rod cover 10, the piston rod 6 and a piston 11. The piston rod 6 moves integrally with the piston 11. The lift cylinder 5 is arranged such that the bottom block 9 is located at the lower end. The bottom block 9 is welded to the housing 8, and the rod cover 10 is threaded to the housing 8. The piston 11 defines an oil chamber 8a in the cylinder housing 8. The piston rod 6 extends through a hole 10a formed in the rod cover 10 and is inserted in the housing 8. A seal 12 is fitted in the hole 10a. Also, an O-ring 13 is fitted between the circumference of the housing 8 and the inner wall of the rod cover 10. A substantially cylindrical stopper 14 is fitted in the upper portion of the housing 8 to limit the extension of the piston rod 6. The lower end of the stopper 14 defines the top dead center position of the piston 11.

The housing 8 has an air outlet 15 in the vicinity of the stopper 14. An overflow pipe 16 is fixed to the outlet 15. When the piston rod 6 is extended, or lifted, air compressed by the piston 11 is sent to a hose 17 through the overflow pipe 16.

A stopper surface 18 is formed in the top of the bottom block 9. The stopper surface 18 limits the movement of the piston 11 by contacting the bottom surface of the piston 11. A sensor chamber 20 is defined in the bottom block 9. The sensor chamber 20 is connected to the oil chamber 8a and accommodates an ultrasonic sensor 19. Also an oil port 21 is formed in the side of the chamber 20. Oil is supplied to and drained from the oil chamber 8a through the oil port 21. The oil port 21 is connected to a control valve 23 through a passage 22. The control valve 23 is connected to an oil pump 24 through a conduit 25a and to an oil tank 26 through a conduit 25b. A temperature sensor 27 is located in the sensor chamber 20 to detect the temperature of oil. Also, a pressure sensor 28 is located in the sensor chamber 20 to detect the pressure of the oil. The passage 22 is connected to the port 21 via a flow regulator valve (not shown).

Figure 2:
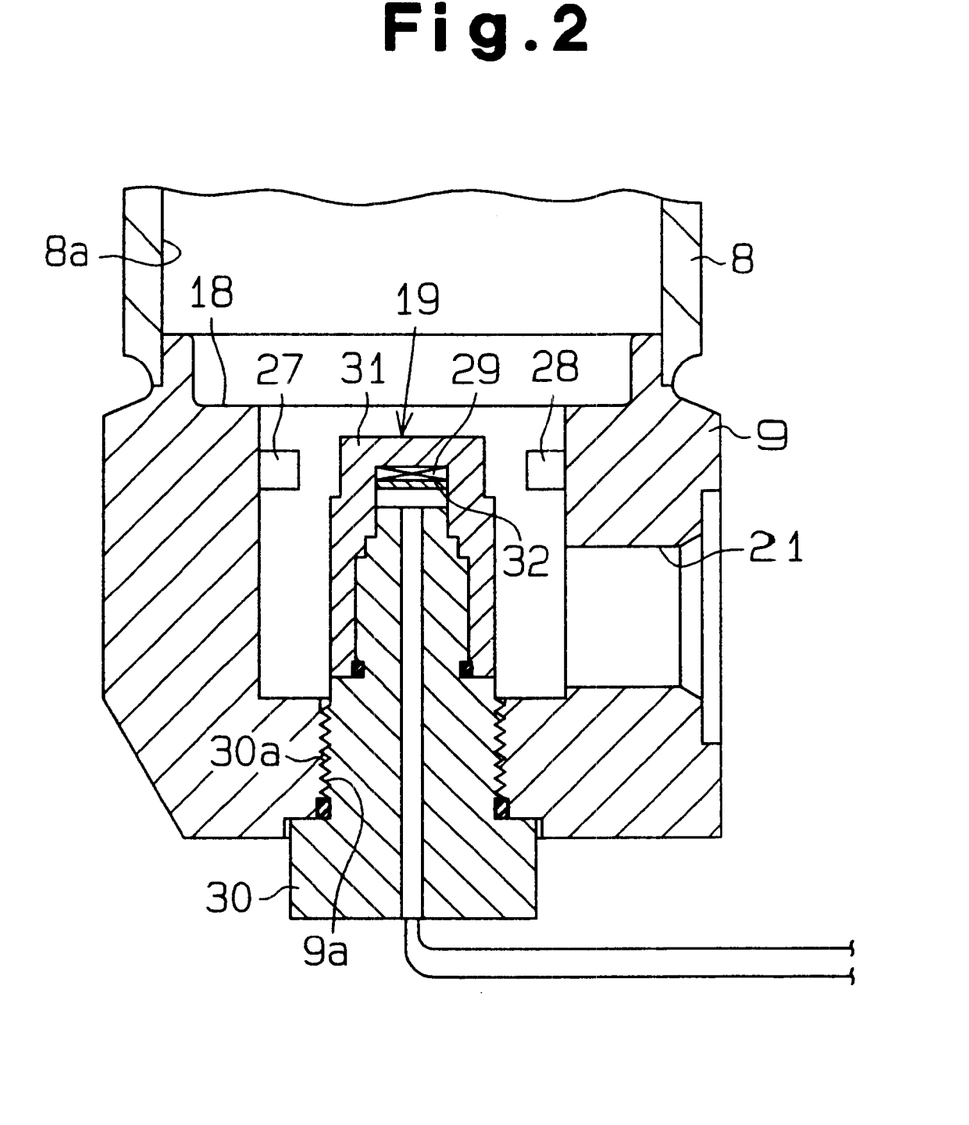
FIG. 2 is an enlarged partial cross-sectional view illustrating the position detector of FIG. 1.

As shown in FIGS. 1 and 2, the ultrasonic sensor 19 is fixed to the bottom block 9 such that its emitting portion faces the piston 11. The ultrasonic sensor 19 includes an oscillator 29, a case 30 for supporting the oscillator 29 and a cap 31 for covering the oscillator 29. The oscillator 29 is also known as an ultrasonic transducer, which oscillates in accordance with electrical signals. The oscillation generates ultrasonic waves. The oscillator 29 also receives ultrasonic waves reflected by an object, oscillates in response, and thus converts the received ultrasonic waves to electric signals. The oscillator 29 is glued to the cap 31 by an adhesive. The cap 31 is press fitted to the case 30. An acoustical material 32 is located beneath the oscillator 29. External threads 30a are formed on the case 30. The case 30 is secured to the bottom block 9 by screwing the case 30 to an internally threaded hole 9a formed in the bottom wall of the bottom block 9. In this embodiment, the ultrasonic sensor 19 is incorporated in the lift cylinder 5.

The cap 31 may be made of any material. The thickness of the cap 31 affects the frequency matching, or the acoustic impedance. Therefore, the thickness of the cap 31 must be determined based on the selected material. When forming the cap 31 with metal, iron and aluminum are preferred because they are easy to machine and possess sufficient strength. In this embodiment, the cap 31 is made of aluminum. The case 30 is also made of metal.

Figure 3:
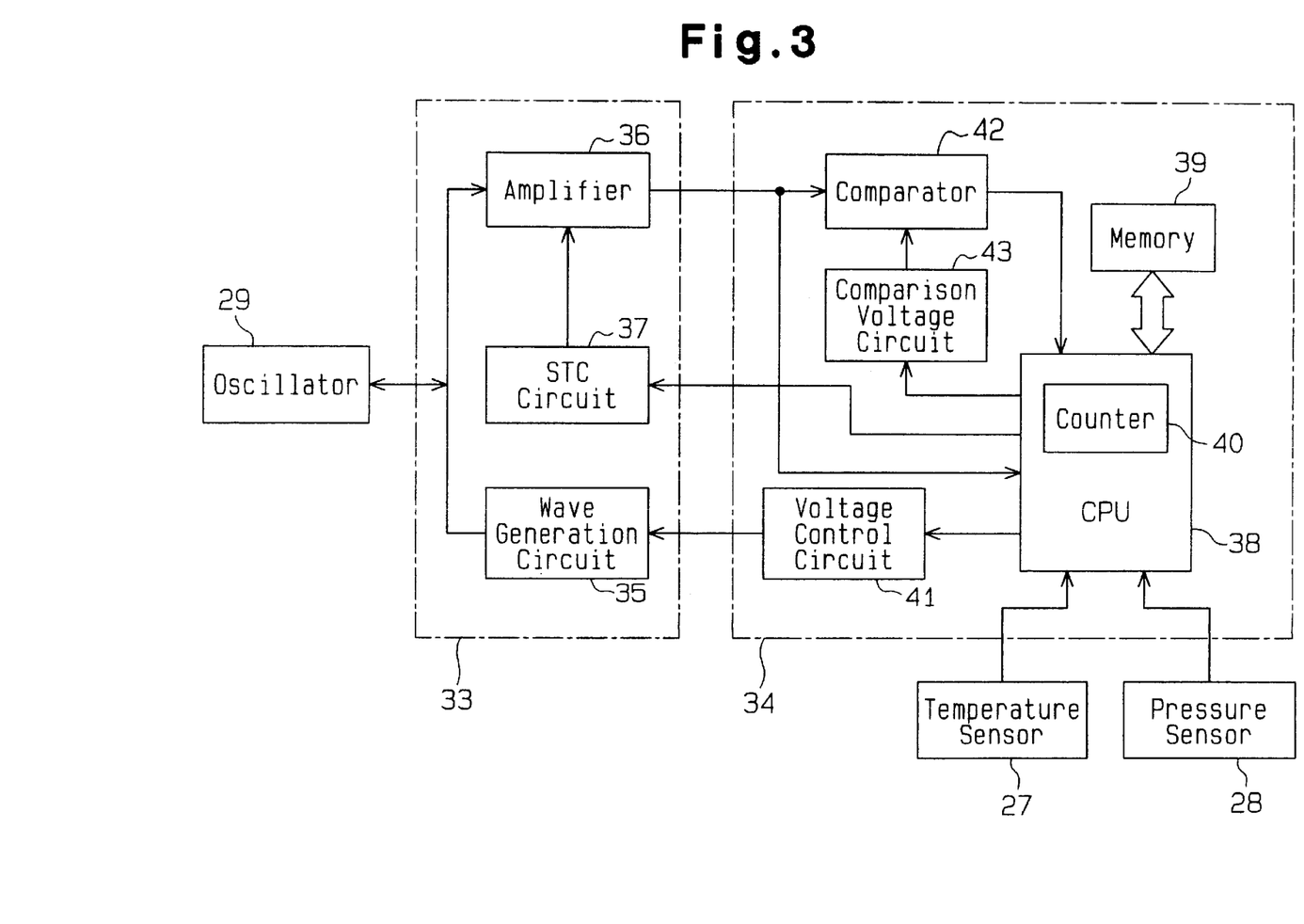
FIG. 3 is a block diagram showing the electric configuration of the position detector shown in FIG. 1.

As shown in FIG. 1, the ultrasonic sensor 19 is electrically connected to an emission-reception circuit 33. The emission-reception circuit 33 is electrically connected to a controller 34. As shown in FIGS. 1 and 3, the emission-reception circuit 33 includes a wave generation circuit 35. The wave generation circuit 35 supplies wave generation signals (voltage signals) that have certain frequencies to the ultrasonic sensor 19 based on control signals from the controller 34. The emission-reception circuit 33 also includes an amplifier 36. The amplifier 36 amplifies reception wave signals from the ultrasonic sensor 19 and sends the amplified signals to the controller 34.

The emission-reception circuit 33 also includes a sensitive time control (STC) circuit 37. The STC circuit 37 controls the amplifier 36 to minimize the influence of noise component in signals from the ultrasonic sensor 19. Specifically, immediately after an ultrasonic wave is emitted, in other words, when the reverberation is greatest, the STC circuit 37 controls the amplifier 36 to lower the signal amplification factor. The STC circuit 37 controls the amplifier 36 to increase the signal amplification factor as time elapses, or as the reverberation is decreased. As a result, the signal-to-noise ratio of signals from the amplifier 36 to the controller 34 is improved, which minimizes the influence of the reverberation noise component in signals from the ultrasonic sensor 19.

The controller 34 includes a central processing unit (CPU) 38 and a memory 39, which stores control programs and data for computing the position of the piston 11. The CPU 38 also includes a counter 40, which measures the time from when the CPU 38 commands the emission of an ultrasonic wave to when the reflection of the ultrasonic wave is received. The controller 34 further includes a voltage control circuit 41, a comparator 42 and a comparison voltage circuit 43. The voltage control circuit 41 controls the wave generation circuit 35 to adjust the voltage level of wave generation signals outputted by the wave generation circuit 35. The voltage level of the wave generation signal determines the amplitude of the ultrasonic wave generated by the ultrasonic sensor 19. The difference between the maximum voltage level and the minimum voltage level of the wave generation signal is, for example, 20 dB. The comparison voltage circuit 43 sends a reference voltage signal to the comparator 42. The comparator 42 compares the level of signals from the amplifier 36 with the level of the reference voltage signal. When the level of the signal from the amplifier 36 exceeds the level of the reference voltage signal, the comparator 42 sends a detection signal (see K1–K4 in FIG. 5) to the CPU 38. The detection signal represents that the ultrasonic sensor 19 has received a reflection of an ultrasonic wave.

The memory 39 stores a formula or a map representing the relationship between the speed of sound and the condition such as temperature and the pressure of oil. The temperature sensor 27 and the pressure sensor 28 are located in the chamber 20. Therefore, the temperature and the pressure detected by the sensors 27, 28 are not necessarily equal to the temperature and the pressure of the oil located in the path of the ultrasonic waves emitted from the ultrasonic sensor 19. Thus, the relationship between the speed of sound and the oil temperature and oil pressure detected by the sensors 27, 28 are determined based on tests.

The CPU 38 computes the temperature and the pressure of oil in the lift cylinder 5 based on detected signals from the sensors 27, 28. The CPU 38 computes the speed c of ultrasonic waves emitted from the ultrasonic sensor 19 (the speed of sound) based on the detected oil temperature and pressure by referring to data in the memory 39. The CPU 38 measures the traveling time t of an ultrasonic wave from when the wave is emitted from the ultrasonic sensor 19 to when the reflection of the wave reaches the sensor 19 by the counter 40. The CPU 38 computes the distance L between the ultrasonic sensor 19 and the bottom of the piston 11 based on the time t and the speed c of sound in the oil. The CPU 38 then computes the position of the fork 4a based on the distance L. The relationship between the time t and the distance L is expressed by the following equation (1).

$$L = ct/2 \quad (1)$$

Figure 4:
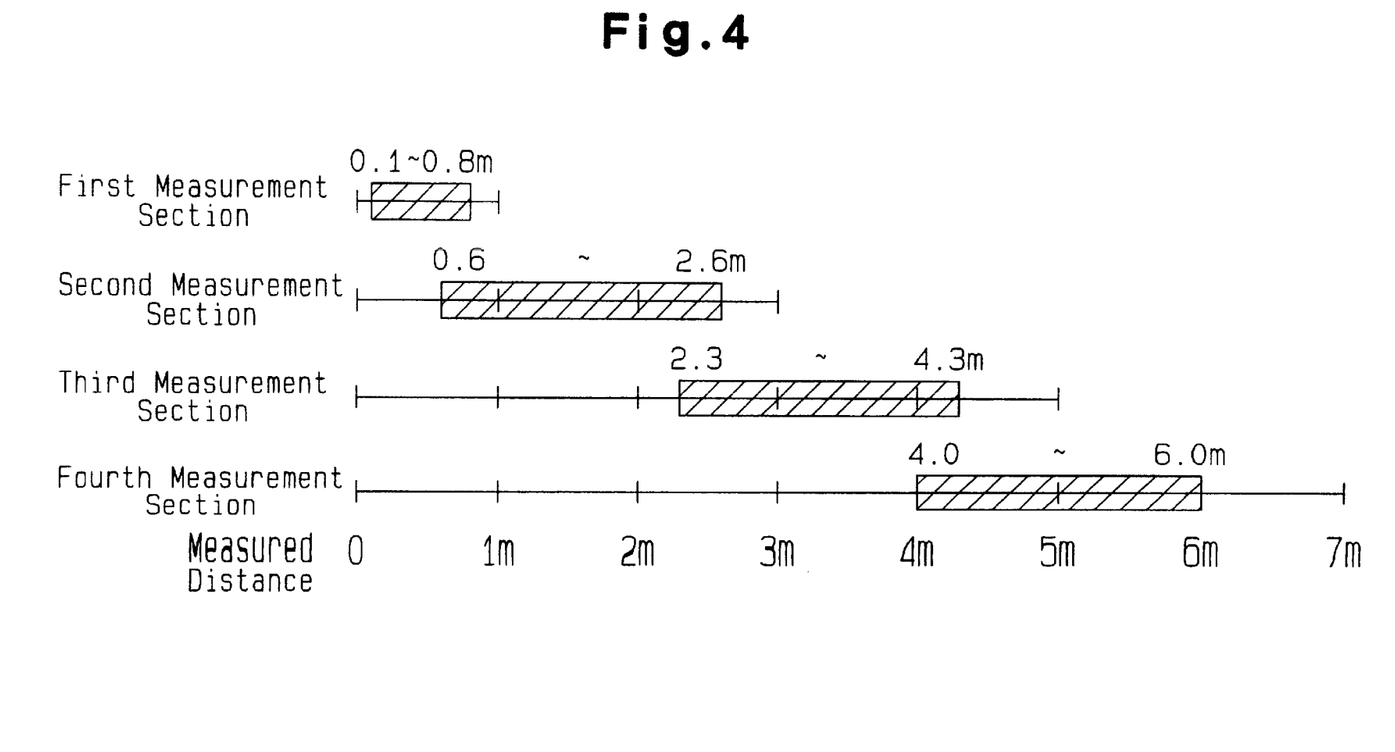
FIG. 4 is a chart showing the detection ranges of the position detector shown in FIG. 1.

In this embodiment, the maximum distance between the ultrasonic sensor 19 and the piston 11, or the maximum distance to be measured by the ultrasonic sensor 19, is divided into several measurement sections. The amplitude of an ultrasonic wave emitted from the ultrasonic sensor 19 correlates with the maximum distance that can be measured by the ultrasonic sensor 19. The greater the amplitude of an ultrasonic wave is, the greater the distance that can be measured is. Thus, the amplitude of an ultrasonic wave emitted from the ultrasonic sensor 19 is varied to correspond to each measurement section. Specifically, the amplitude is greater for a section of longer measured distances. In other words, the voltage level of the wave generation signal that is supplied to the ultrasonic sensor 19 is increased for a section that includes longer measured distances. The voltage level of the wave generation signal is determined such that the amplitude of an ultrasonic wave corresponding to each section is minimum for measuring the greatest distance in the section.

For example, if the maximum distance that is measured by the ultrasonic sensor 19 is six meters, the maximum distance is divided into first, second, third and fourth measurement sections. The first section includes distances from 0.1 meters to 0.8 meters. The second section includes distances from 0.6 meters to 2.6 meters. The third section includes distances from 2.3 meters to 4.3 meters. The fourth section includes distances from 4.0 meters to 6.0 meters. Each pair of adjacent sections overlap with each other.

The amplitude of first ultrasonic wave, which correspond to the first measurement section, is determined such that the ultrasonic sensor 19 can measure the distance L between the piston 11 and the sensor 19 up to one meter. However, the first measurement section ranges from 0.1-meter point to the 0.8-meter point. In other words, when the first ultrasonic wave is generated, the reflected wave is valid only when the piston 11 is spaced apart from the sensor 19 by the distance L in a range from 0.1-meter point to 0.8-meter point. The traveling time t of the first ultrasonic wave when the piston 11 is spaced apart from the sensor 19 by 0.1 meters or 0.8 meters can be computed based on the equation (1). Therefore, after the first ultrasonic wave is generated, only the reflected wave that is received during a period from when the traveling time t that corresponds to the distance L of 0.1 meters has elapsed to when the traveling time t that corresponds to the distance L of 0.8 meters has elapsed are validated based on the time measured by the counter 40.

When the first ultrasonic wave is generated, the STC circuit 37 controls the amplifier 36 to perform amplification such that only the reflected wave that is received during the period from when the traveling time t that corresponds to the distance L of 0.1 meters has elapsed to when the traveling time t that corresponds to the distance L of 0.8 meters has elapsed are validated. As a result, before or after the period that corresponds to the distance L in the range between 0.1-meter point and 0.8-meter point, the level of signals sent from the amplifier 36 to the comparator 42 is lower than the level of the referential voltage signal, and the comparator 42 does not send detected signals to the CPU 38. In this manner, the first measurement section is set as a range between 0.1-meter point to 0.8-meter point.

When the distance L between the ultrasonic sensor 19 and the piston 11 is smaller than 0.1 meters, which is one tenth of the maximum detectable distance of the sensor 19, a reflected wave cannot be accurately detected due to reverberation of the first ultrasonic wave. When the distance L is close to the maximum detectable distance, or in a range between 0.8-meter point and one-meter point, the first ultrasonic wave is significantly attenuated, which prevent the reflected wave to be accurately detected. Setting the first measurement section as a range from the 0.1-meter point to the 0.8-meter point permits the reflected wave of the first ultrasonic wave to be accurately detected.

The amplitude of second ultrasonic wave, which corresponds to the second measurement section, is determined such that the ultrasonic sensor 19 can measure the distance L between the piston 11 and the sensor 19 up to three meters. Also, in the same manner as described above, the STC circuit 37 controls the amplifier 36 such that the second measurement section ranges from the 0.6-meter point to the 2.6-meter point.

The amplitude of third ultrasonic wave, which corresponds to the third measurement section, is determined such that the ultrasonic sensor 19 can measure the distance L between the piston 11 and the sensor 19 up to five meters. Also, in the same manner as described above, the STC circuit 37 controls the amplifier 36 such that the third measurement section ranges from the 2.3-meter point to the 4.3-meter point.

The amplitude of fourth ultrasonic wave, which corresponds to the fourth measurement section, is determined such that the ultrasonic sensor 19 can measure the distance L between the piston 11 and the sensor 19 up to seven meters. Also, in the same manner as described above, the STC circuit 37 controls the amplifier 36 such that the fourth measurement section ranges from the 4.0-meter point to the 6.0-meter point.

As a result, the ultrasonic sensor 19 can detect the distance in a range from 0.1-meter point to 6.0-meter point.

To detect the position of the piston 11, the CPU 38 causes the ultrasonic sensor 19 to consecutively emit the first to fourth ultrasonic waves at predetermined time intervals. When the CPU 38 receives a detected signal that represents that the sensor 19 has received a reflected wave from the comparator 42, the CPU 38 stops generating ultrasonic waves.

Figure 5:
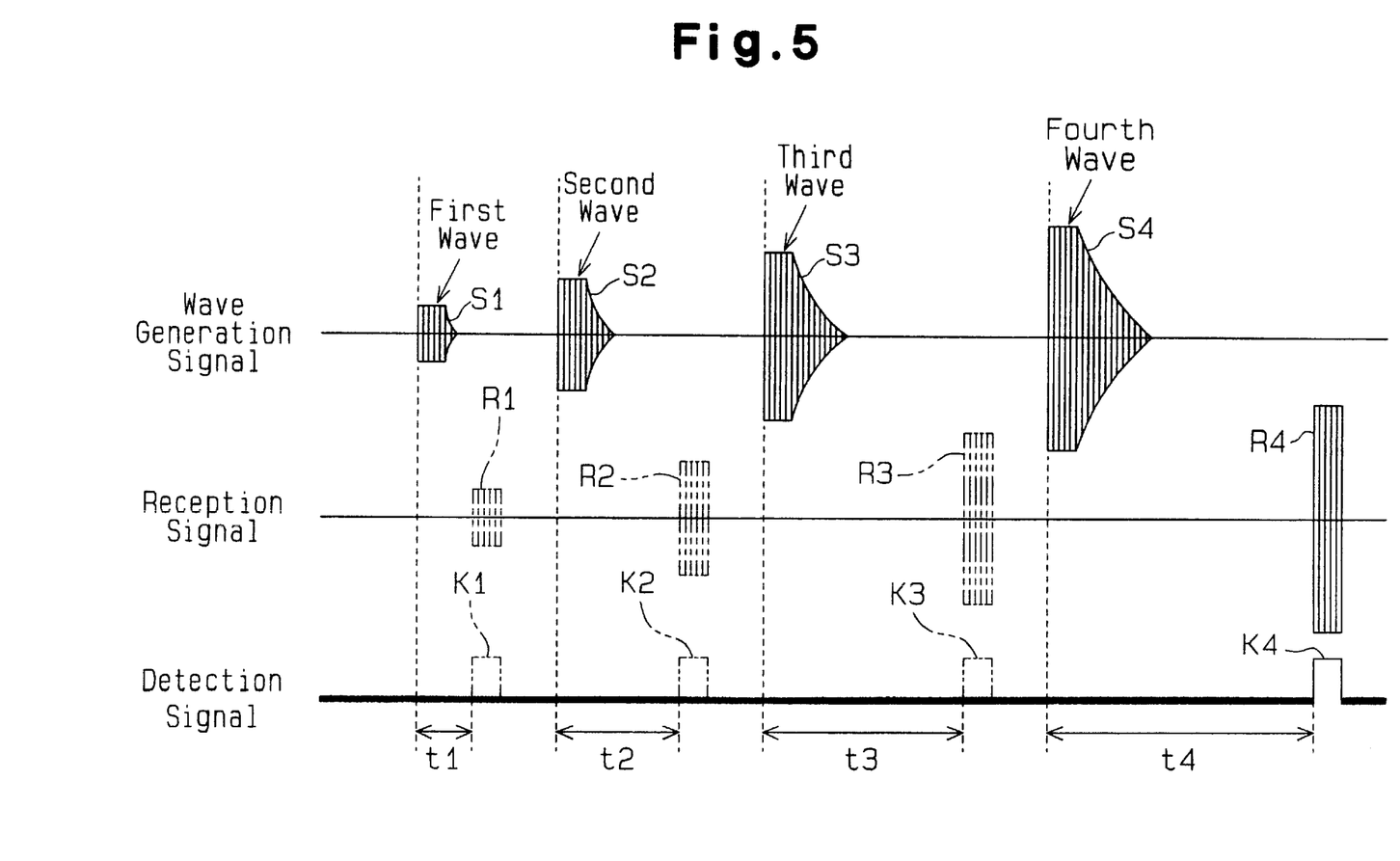
FIG. 5 is a graph showing the detection procedure of the position detector shown in FIG. 1.

FIG. 5 is a timing chart showing wave generation signals S1, S2, S3 and S4, reception signals R1, R2, R3 and R4 and detection signals K1, K2, K3 and K4. The wave generation signals S1–S4 are sent from the wave generation circuit 35 to the ultrasonic sensor 19. The reception signals R1–R4 are generated by the ultrasonic sensor 19 when the sensor 19 receives reflected waves. The detection signals K1–K4 are generated by the comparator 42. To detect the position of the piston 11, the CPU 38 controls the wave generation circuit 35 through the voltage control circuit 41 to output the wave generation signal S1. The ultrasonic sensor 19 emits the first ultrasonic wave in response to the wave generation signal S1. If the position of the piston 11 is in the first measurement section, the ultrasonic sensor 19 receives the reflection of the first ultrasonic wave and generates the reception signal R1. The reception signal R1 is amplified by the amplifier 36 and is then sent to the comparator 42. Since the level of the reception signal R1 is higher than the level of the referential voltage signal, the comparator 42 outputs the detection signal K1 to the CPU 38. The CPU 38 computes the position of the piston 11 based on time t1 from when the wave generation signal S1 was outputted to when the detection signal K1 is inputted. The CPU 38 does not send the wave generation signals S2–S4 to the wave generation circuit 35. Thus, the ultrasonic sensor 19 does not emit the second to fourth ultrasonic waves.

If the piston 11 is out of the first measurement section, the CPU 38 does not receive the detection signal K1. In this case, the CPU 38 controls the wave generation circuit 35 to output the wave generation signal S2 subsequent to the wave generation signal S1. The ultrasonic sensor 19 emits the second ultrasonic wave in response to the wave generation signal S2. If the position of the piston 11 is in the second measurement section, the ultrasonic sensor 19 receives the reflection of the second ultrasonic wave and generates the reception signal R2. The reception signal R2 is amplified by the amplifier 36. Since the level of the amplified reception signal R2 is higher than the level of the referential voltage signal, the comparator 42 outputs the detection signal K2 to the CPU 38. The CPU 38 computes the position of the piston 11 based on time t2 from when the wave generation signal S2 was outputted to when the detection signal K2 is inputted. The CPU 38 does not send the wave generation signals S3 and S4 to the wave generation circuit 35. Thus, the ultrasonic sensor 19 does not emit the third and fourth ultrasonic waves.

If the piston 11 is out of the first and second measurement sections, the CPU 38 does not receive the detection signal K2. In this case, the CPU 38 controls the wave generation circuit 35 to output the wave generation signal S3 subsequent to the wave generation signal S2. The ultrasonic sensor 19 emits the third ultrasonic wave in response to the wave generation signal S3. If the position of the piston 11 is in the third measurement section, the CPU 38 computes the position of the piston 11 based on time t3 from when the wave generation signal S3 was outputted to when the detection signal K3 is inputted in the same manner as when the piston 11 is in the first or second measurement sections. The CPU 38 does not send the wave generation signal S4 to the wave generation circuit 35. Thus, the ultrasonic sensor 19 does not emit the fourth ultrasonic wave.

If the piston 11 is out of the first, second and third measurement sections, the CPU 38 does not receive the detection signal K3. In this case, the CPU 38 controls the wave generation circuit 35 to output the wave generation signal S4 subsequent to the wave generation signal S3. The ultrasonic sensor 19 emits the fourth ultrasonic wave in response to the wave generation signal S4. Since the piston 11 is in the fourth measurement section, the CPU 38, the CPU 38 computes the position of the piston 11 based on time t4 from when the wave generation signal S4 was outputted to when the detection signal K4 is inputted.

In this manner, ultrasonic waves are emitted up to four times to detect the position of the piston 11. The measurement is consecutively executed for the range of each measurement section from the section that corresponds to the shortest detected distances. The amplitude of the ultrasonic wave is set smaller for a section that has shorter detected distances. The interval between subsequent emissions of ultrasonic waves is determined by taking the traveling time of the ultrasonic waves into account such that the latter ultrasonic wave does not interfere with the reflection of the former ultrasonic wave. In other words, the interval between subsequent emissions is determined such that each emission of ultrasonic wave takes place after a predicted period in which the reflection of the preceding ultrasonic wave is to be received.

The operation of the above described height detector will now be described.

When the loading lever 7 is at the neutral position, the passage 22 is disconnected from the conduits 25a, 25b. Therefore, the passage 22 does not either supply oil to or drain oil from oil chamber 8a, which locks the piston rod 6.

When the loading lever 7 is moved to the lift position, the control valve 23 is switched to a supply position for communicating the passage 22 with the conduit 25a, which supplies oil discharged from the pump 24 to the oil chamber 8a via the passage 22. As a result, the pressure of the oil in the oil chamber 8a raises the piston 11 and the piston rod 6, which lifts the fork 4a.

When the loading lever 7 is switched to a lowering position, the control valve 23 is switched to a drain position for communicating the passage 22 with the conduit 25b. As a result, the force based on the weight of the piston rod 6 and the fork 4a lowers the piston rod 6 and the piston 11, which drains oil from the oil chamber 8a. At this time, the flow regulator valve (not shown) permits the piston rod 6 to be lowered at a constant rate regardless whether there is load on the fork 4a.

When detecting the position of the fork 4a, the CPU 38 first controls the ultrasonic sensor 19 to emit the first ultrasonic wave, which corresponds to the first measurement section, in the manner described above. The ultrasonic wave progresses through the oil in the oil chamber 8a. If the piston 11 is in the first measurement section, the first ultrasonic wave is reflected by the bottom of the piston 11 and the reflection is received by the ultrasonic sensor 19. Accordingly, the distance L between the sensor 19 and the piston 11 is computed.

If the piston 11 is not in the first measurement section, the second ultrasonic wave, which corresponds to the second measurement section, is emitted. If the piston 11 is not in the second measurement section, either, the third ultrasonic wave, which corresponds to the third measurement section, is emitted. If the piston 11 is not in the third measurement section, the fourth ultrasonic wave, which corresponds to the fourth measurement section, is emitted.

After the distance L between the ultrasonic sensor 19 and the piston 11 is computed, the CPU 38 computes the height H of the fork 4a based on data that is stored in the memory 39 and represents the relationship between the distance L and the fork height H.

The speed of the piston 11 may be computed based on the changes in the distance L. That is, the distance L is detected twice in relatively short time and the difference ΔL between the detected distances L is computed. Also, the interval ΔT of the detections is detected. The speed V of the piston 11 is computed by the following equation (2).

$$V=\Delta L/\Delta T \quad (2).$$

The speed of the fork 4a, which is moving up or down, is computed based on the value V. Whether the fork 4a is being lifted or lowered is detected based on whether the value V is positive or negative.

The embodiment of FIGS. 1 to 6 has the following advantages.

(1) The position of the piston 11 is detected even if the piston 11 is located in the vicinity of the ultrasonic sensor 19. That is, the position of the piston 11 can be detected in substantially the entire range of the movement of the piston 11, which minimizes the range in which the position of the piston 11 cannot be detected.

(2) The detection of the position of the piston 11 is consecutively performed from the measurement section that includes shorter detected distances. The amplitude of the ultrasonic wave is smaller for a measurement section that has shorter detected distances. Therefore, if the piston 11 is relatively close to the ultrasonic sensor 19, a relatively small voltage signal is supplied to the ultrasonic sensor 19. In other words, a voltage signal the value of which is greater than required is not supplied to the ultrasonic sensor 19, which reduces the power consumption.

(3) When the reflection of an ultrasonic wave is detected, the remainder of the ultrasonic wave emissions is not performed, which eliminates waste.

(4) The emission and reception of ultrasonic waves are executed by the single oscillator 29. Thus, the ultrasonic sensor 19 occupies a relatively small space in the lift cylinder 5. The diameter of the lift cylinder 5 can be therefore reduced.

(5) The speed of the piston 11 is easily obtained by using the data of the location of the piston 11.

It should be apparent to those skilled in the art that the present invention may be embodied in many other specific forms without departing from the spirit or scope of the invention. Particularly, it should be understood that the invention may be embodied in the following forms.

The present invention may be applied to industrial vehicles other than the forklift 1. For example, the present invention may be applied to a vehicle for high lift work, a carrying vehicle, a construction vehicle. The present invention may also be applied to other types of vehicles. Further, the present invention may be applied to any type of machines as long as the machines include a hydraulic cylinder. Also, the present invention is not limited to the use in the cylinder 5.

In the illustrated embodiment, the emission and reception of ultrasonic waves are performed by the single element of the ultrasonic sensor 19. However, two elements that correspond to the emission and the reception, respectively, may be used. In this case, the reverberation of an ultrasonic wave that is emitted from the emitting element is not received by the element for receiving reflections. Therefore, even if the piston 11 is located close to the sensor 19, the position of the piston 11 is accurately detected.

In the illustrated embodiment, the position detector is located in the lift cylinder 5. However, the position detector may be located in the tilt cylinder, which tilts the mast 3. In this case, the position of the piston in the tilt cylinder is detected, and the accurate tilt angle of the mast 3 is computed, accordingly. The accuracy of control procedures based on the tilt angle of the mast 3 is improved.

The detection of the position of the piston 11 may be started from any one of the measurement sections. For example, the position detection may be started from a measurement section that includes the piston position of the preceding detection. In this case, the position of the piston 11 is efficiently detected.

The detectable distance range may be divided into sections the number of which is other than four. For example, if the detectable distance range is divided into two sections, one of the sections corresponds to a relatively short distances (for example, from 0.1-meter point to 0.8-meter point) and the other section corresponds to the remainder of the detectable range (for example, from 0.6-meter point to 6.0-meter point).

The emission-reception circuit 33 and the controller 34 may be integrated.

Therefore, the present examples and embodiments are to be considered as illustrative and not restrictive and the invention is not to be limited to the details given herein, but may be modified within the scope and equivalence of the appended claims.

What is claimed is:

1. A device for detecting the position of a movable body that moves in a predetermined move range, comprising:

an ultrasonic sensor, wherein the ultrasonic sensor emits ultrasonic waves toward the movable body and receives ultrasonic waves that are reflected by the movable body; and a controller for controlling the ultrasonic sensor, wherein the controller controls the ultrasonic sensor to consecutively emit a plurality of ultrasonic waves that have different amplitudes at predetermined intervals, thereby measuring the distance between the ultrasonic sensor and the movable body, and wherein the controller computes the distance between the ultrasonic sensor and the movable body based on a period from when the ultrasonic sensor emits one of the ultrasonic waves to when the ultrasonic sensor receives the one ultrasonic wave that is reflected by the movable body, wherein the move range of the movable body is divided into a plurality of measurement sections, wherein each ultrasonic wave is assigned to one of the measurement sections, wherein the controller uses each ultrasonic wave for detection in the corresponding measurement section, and wherein the range of each measurement section is determined such that the maximum detectable distance defined by that measurement section is less than the maximum distance detectable by using the corresponding ultrasonic wave.

2. The device according to claim 1, wherein the amplitude of the ultrasonic wave is smaller for a measurement section that is closer to the ultrasonic sensor.

3. The device according to claim 1, wherein the controller controls the ultrasonic sensor such that the ultrasonic waves are emitted in order of smallness of amplitude.

4. The device according to claim 1, wherein, when the ultrasonic sensor receives the reflection of one of the ultrasonic waves, the controller controls the ultrasonic sensor to stop emitting the remainder of the ultrasonic waves.

5. The device according to claim 1, wherein the controller determines the emission intervals of the ultrasonic waves such that each ultrasonic wave is emitted after a predicted period in which the reflection of the preceding ultrasonic wave is to be received.

6. The device according to claim 1, wherein the movable body is a piston of a fluid cylinder, and wherein the ultrasonic sensor is attached to one end of the cylinder to face the piston.

7. A device for detecting the position of a piston of a fluid cylinder, wherein the piston moves in a predetermined move range, the device comprising:

an ultrasonic sensor that is attached to one end of the cylinder to face the piston, wherein the ultrasonic sensor emits ultrasonic waves toward the piston, each ultrasonic wave having an amplitude that corresponds to an electric wave generation signal supplied to the ultrasonic sensor, and wherein the ultrasonic sensor receives the ultrasonic waves that are reflected by the piston and induces an electric reception signal that corresponds to each received ultrasonic wave; and a controller for controlling the ultrasonic sensor, wherein the controller supplies the electric wave generation signal to the ultrasonic sensor so that the ultrasonic sensor emits an ultrasonic wave and receives the electric reception signal from the ultrasonic sensor, wherein the controller divides the move range of the piston into a plurality of measurement sections and assigns each of a plurality of ultrasonic waves that have different amplitudes to one of the measurement sections, wherein the amplitude of the ultrasonic wave is smaller for a measurement section that is closer to the ultrasonic sensor, wherein the controller controls the ultrasonic sensor to consecutively emit the ultrasonic waves at predetermined intervals, thereby measuring the distance between the ultrasonic sensor and the piston, wherein the controller uses each ultrasonic wave for detection in the corresponding measurement section, and wherein the controller computes the distance between the ultrasonic sensor and the piston based on a period from when the ultrasonic sensor emits one of the ultrasonic waves to when the ultrasonic sensor receives the one ultrasonic wave that is reflected by the piston, wherein the range of each measurement section is determined such that the maximum detectable distance defined by that measurement section is less than the maximum distance detectable by using the corresponding ultrasonic wave.

8. The device according to claim 7, wherein the controller controls the ultrasonic sensor such that the ultrasonic waves are emitted in order of smallness of amplitude.

9. The device according to claim 7, wherein, when the ultrasonic sensor receives the reflection of one of the ultrasonic waves, the controller controls the ultrasonic sensor to stop emitting the remainder of the ultrasonic waves.

10. A method for detecting a position of a movable body that moves in a predetermined move range by using ultrasonic waves emitted from an ultrasonic sensor, the method comprising:

dividing the move range of the movable body into a plurality of measurement sections;

assigning each of a plurality of ultrasonic waves that have different amplitudes to one of the measurement sections;

consecutively emitting the ultrasonic waves at predetermined intervals from the ultrasonic sensor, thereby measuring the distance between the ultrasonic sensor and the movable body, wherein each ultrasonic wave is used for detection in the corresponding measurement section;

determining the range of each measurement section such that the maximum detectable distance defined by that measurement section is less than the maximum distance detectable by using the corresponding ultrasonic wave; and computing the distance between the ultrasonic sensor and the movable body based on a period from when the ultrasonic sensor emits one of the ultrasonic waves to when the ultrasonic sensor receives the one ultrasonic wave that is reflected by the movable body.

11. The method according to claim 10, wherein the amplitude of the ultrasonic wave is smaller for a measurement section that is closer to the ultrasonic sensor.

12. The method according to claim 10, wherein the ultrasonic waves are emitted in order of smallness of amplitude.

13. The method according to claim 10, further comprising stopping emitting the remainder of the ultrasonic waves when the reflection of one of the ultrasonic waves is received by the ultrasonic sensor.

14. The method according to claim 10, wherein the emission intervals of the ultrasonic waves are determined such that each ultrasonic wave is emitted after a predicted period in which the reflection of the preceding ultrasonic wave is to be received.

* * * * *